United States Patent [19]
Inoue

[11] Patent Number: 5,330,097
[45] Date of Patent: Jul. 19, 1994

[54] HOT DIFFUSION WELDING METHOD

[75] Inventor: Shinichiro Inoue, Hirakata, Japan

[73] Assignee: Komatsu Ltd., Tokyo, Japan

[21] Appl. No.: 966,170

[22] PCT Filed: Jul. 23, 1991

[86] PCT No.: PCT/JP91/00976

§ 371 Date: Jan. 25, 1993

§ 102(e) Date: Jan. 25, 1993

[87] PCT Pub. No.: WO92/01528

PCT Pub. Date: Feb. 6, 1992

[30] Foreign Application Priority Data

Jul. 24, 1990 [JP] Japan .................................. 2-195959
Oct. 19, 1990 [JP] Japan .................................. 2-280948

[51] Int. Cl.$^5$ ..................... B23K 11/00; B23K 11/18; B23K 11/20
[52] U.S. Cl. .................................. 228/194; 228/208; 219/85.15; 219/78.02
[58] Field of Search ............... 228/193, 194, 208, 234, 228/242; 219/78.02, 85.14, 85.15

[56] References Cited

U.S. PATENT DOCUMENTS 4,194,672  3/1980  Uto et al. ......................... 228/194
4,493,964  1/1985  Shigemasa ........................ 219/78.02

Primary Examiner—Samuel M. Heinrich
Attorney, Agent, or Firm—Millen, White, Zelano, & Branigan

[57] ABSTRACT

A hot diffusion welding method wherein a first part generally made from a material different from a second part and the second part made from copper alloy are united with an insert material interposed between the joint faces thereof under a heated and pressurized condition. The insert material at the joint between the first and second parts is copper plating formed on the joint face of the first part made from the different material, so that the thermal conductivity between the two parts is improved to perform smooth resistance heating. This enables continuous welding operation without polishing the conductive surfaces of a pair of electrodes in order to eliminate oxides therefrom.

When the insert material interposed between the joint faces of the two parts is a normal brazing filler metal, resistance heating is carried out with an even number of superposed bodies in each of which the second part, insert material, first part are superposed, the superposed bodies being assembled in such a manner that the respective second parts are brought into contact with each other. In this case, the first parts having a greater thermal capacity are in contact with the pair of electrodes, whereby polishing for eliminating oxides from the conductive surfaces of the electrodes is no longer necessary and continuous welding operation can be thus accomplished.

26 Claims, 1 Drawing Sheet

HOT DIFFUSION WELDING METHOD

TECHNICAL FIELD

The invention relates to a hot diffusion welding method in which an insert material is interposed between a first part and a second part and those parts are united under a heated and pressurized condition, when joining the second part to the first part.

BACKGROUND ART

In order to produce machine parts capable of serving their individual, characteristic functions, a casting method has been conventionally and extensively employed in joining the first and second parts which are formed of metallic materials having different properties (in this specification, the first part is a part to which another part is to be joined and the second part is a part to be joined to the first part). However, such a casting method is limited in its application when the second part is made from an alloy. Because it is inevitably required in the casting method to completely melt the second part, and in the case that the second part is made from an alloy and this alloy especially contains a metal having a low-boiling point, such a metal vaporizes during the melting of the entire alloy. This causes such a phenomenon that when the second part is made from an alloy of copper and zinc for example, zinc vaporizes just before the melting point of the alloy and forms a layer of zinc or zinc oxide on the surface of the second part. This phenomenon reduces the bonding strength of the second part at the joint face of the first part, or causes a difference between the copper-zinc composition ratio of the second part and that of the casting material. Therefore, it has been thought to be very difficult to unite the second part made from an alloy to the surface of the first part by means of the casting method.

Diffusion welding is a method of uniting parts by not melting but applying pressure to the second part so as to be joined to the first part. Like the ultra-high pressure welding method and the HIP method, in which ultra-high pressure (hydrostatic pressure in the case of the HIP method) is applied to the first and second parts which have been superposed, in the coaxial superposed direction thereof, diffusion welding is suitably employed for the second part made from one of the above-mentioned materials that are difficult to unite by casting.

Of the above welding techniques taken in a solid phase condition, the hot diffusion welding method, in which an insert material is interposed between the first and second parts and each part is subjected to heating and pressurizing so that they are united, can be the most promising in achieving excellent bonding effects by suitably selecting an insert material.

In the hot diffusion welding method, it is common to utilize resistance heat as heating means, the resistance heat being generated by supplying a current. One example of such a technique conventionally used can be seen in the welding of a sliding member for a hydraulic apparatus. According to this conventional technique, as shown in FIG. 3, a brazing filler metal of normal type 33 serving as the insert material is interposed between a first part 31 such as a shoe formed of a SCM material and a second part 32 such as a sliding member formed of a PBC material, thereby forming a body in which the first part 31, the brazing filler metal 33 and the second part 32 are superposed. Then, the hot diffusion welding method is performed in such a way that while a pressure 38 being applied to the superposed body thus obtained, the superposed body is heated by supplying a current from a power source 39 through a copper electrode 34 and another copper electrode 35. In the above-described conventional hot diffusion welding method, heat is not easily transferred between the first part 31 and the second part 32 because of the interposition of the normal brazing filler metal 33. Further, since the second part 32 is generally thin in its shape and has a small thermal capacity, Joule heat generated at the second part 32 is transmitted to the copper electrode 34 when the second part 32 is brought into direct contact with the copper electrode 34 which has been water-cooled, with the result that the joint faces cannot be heated to a temperature which is high enough to carry out diffusion welding with the melting behaviour of the brazing filler metal 33 interposed between the joint faces. It is, therefore, unavoidably necessary to provide an auxiliary electrode 36 of doughnut shape serving as a heat insulating material between the copper electrode 34 and the second part 32, as well as an electrode such as a silver-tungsten electrode 37 for compensating for the electric conductivity of the auxiliary electrode 36.

In the resistance heating means in the conventional technique as mentioned above, even the silver-tungsten electrode 37 is oxidized at the surface thereof as the number of welding operations increases, so that the deformation rate of the silver-tungsuten electrode 37 which is in contact with the surface of the second part 32 increases as well with the increased welding operations. This causes such a trouble that it becomes necessary to polish the silver-tungsten electrode 37 to remove the oxide film formed thereon when the deformation rate exceeds a certain level. Furthermore, electrodes other than the copper electrodes 34 and 35, namely, the auxiliary electrode 36 and the silver-tungsten electrode 37 need to be prepared for every size of the second part 32, and this increases the complexity of the apparatus for carrying out hot diffusion welding.

In the conventional hot diffusion welding method where resistance heating is utilized as heating means, there are limitations in using a brazing filler metal as the insert material. Taking amorphous metals used as the brazing filler metal in hot diffusion welding method for example, those metals available in the market are limited in their quality and characteristics and therefore often fail in achieving a satisfactory bonding strength. Concretely, amorphous metals have the following disadvantages:

(a) most of them are in the form of metal foils having low melting points and high ductility, so that the bonding strength decreases when heat generated by friction or shear force is added;

(b) although some amorphous metals containing components such as tungsten and molybdenum have high melting points, they still have disadvantages in wettability for the adaptability with the first part and/or second part; and (c) in the first part and/or second part, they create fragile intermetallic compounds between metals contained as impurities and metals constituting the parts.

Therefore, brazing filler metals unavoidably exhibit a poor bonding strength when used in the welding of machine parts such as sliding members of a hydraulic apparatus where high heat resistance is required and where a great shear force is applied.

DISCLOSURE OF THE INVENTION

In order to overcome the foregoing various problems, the invention aims to provide a hot diffusion welding method that is capable of not only uniting the second part made from materials difficult to unite by casting methods, but also obtaining stable resistance heat with the use of simplified electrodes by employing an insert material in specified forms interposed between the first and second parts. Another object of the invention is to provide a hot diffusion welding method wherein even when a normal brazing filler metal is interposed between the first and second parts as the insert material, the above simplified electrodes can be used for obtaining resistance heat and continuous hot welding operation can be performed.

In order to achieve the first object, one form of a hot diffusion welding method according to the invention comprises:

(a) a plating layer forming step of forming a plating layer as an insert material on a joint face of a first part to which a second part is to be jointed;

(b) a superposing step of superposing a second part on the first part with the plating layer between, the plating layer being formed on the joint face of the first part in the above plating layer forming step; and (c) a heating and pressurizing step of heating, with resistance heat, a joint of a superposed body which has been obtained in the above superposing step, the resistance heat being generated by supplying a current, and pressurizing the superposed body in the superposed direction thereof to unite the first and second parts at the joint at which the plating layer is formed.

When the second part is a copper metal part made from pure copper or a copper alloy, the above insert material is preferably a copper plating layer made of pure copper or a copper alloy applied to the joint face of the first part. The above copper metal part may be obtained by continuous casting, extrusion molding or similar methods, and may be made from a copper metal of any composition including copper alloys such as Cu-Zn alloys, Cu-Sn alloys, Cu-Al alloys and Cu-Pb alloys. As the first part, iron materials such as SCM and SS are generally used, but it is obviously possible to employ any kinds of pure metals and alloys. In a special case, the first part may be made from the same material as the second part. The copper plating layer formed as the insert material may be any kind of copper plating and its typical composition is Cu-Zn alloy. This plating layer may consist of not only one kind of layer but a multiple kinds of layers. Nickel plating or copper plating may be done to provide underplate for the purpose of improving the affinity for the first part made from an iron material.

Since the insert material is a plating layer as described above, the joint faces of the first and second parts are closely fitted, forming a smooth structure. Therefore, with the pressure applied in the superposed direction, the joint face of the second part can be perfectly adhered to the joint face of the first part throughout the joint area with the plating layer between. When resistance heat is generated by supplying a current to the first and second parts through the pair of electrodes which are electrically in contact the first and second parts respectively, the substantially same heat conductivity as obtained in a single body can be maintained between the first and second parts. This facilitates the heat transmission between the first and second parts. As a result, even if the second part that is usually thin in its shape and has a small thermal capacity is in direct contact with the water-cooled electrode, the joint is well heated so that the hot diffusion welding can be smoothly carried out between the first and second parts. This enables the pair of electrodes to have a simple structure which does not need any other electrodes such as an auxiliary electrode for preventing the excessive cooling (the cooling should be prevented for the reason mentioned above) and an silver-tungsten electrode for compensating for the contact resistance especially for the second part.

When a copper plating layer is employed as the insert material for the second part made from a copper metal, the copper plating layer exhibits excellent wettability so that a great bonding strength can be ensured.

In order to achieve the second object of the invention, another form of a hot diffusion welding method according to the invention comprises:

(a) a superposing step of superposing a second part, which is a part to be joined to a first part, upon the first part with an insert material between;

(b) an assembling step of assembling at least two superposed bodies which have been obtained in the above superposing step, in such a manner that the second parts in the respective superposed bodies are brought into contact with each other; and (c) a heating and pressurizing step of heating, with resistance heat, joints of the two superposed bodies which have been assembled in the above assembling step, the resistance heat being generated by supplying a current, and pressurizing them in the superposed direction so that the first parts are united with the corresponding second parts at the joints at each of which the insert material is formed.

In the case that at least two superposed bodies are assembled in such a manner that the respective second parts are brought into contact with each other, and resistance heat is generated by supplying a current to the superposed bodies through a pair of electrodes electrically in contact therewith, the first part has a comparatively large space between the electrical-contact face and the face provided with the insert material and is configured to have a great thermal capacity, so that resistance heat high enough to melt the insert material can be generated and constantly kept. Therefore, even when a brazing filler metal, which has difficulty in inducing heat transmission between the first and second parts, is used as the insert material, it is not necessary to employ the conventionally used auxiliary electrode and silver-tungsten electrode. Accordingly, the second part is not in electrical contact with the silver-tungsten electrode but in electrical contact with the second part of another superposed body to be assembled. Each time hot diffusion welding is completed, the faces with which the respective second parts come in contact are renewed, so that even when a brazing filler metal is employed as the insert material, no oxide film will be created on the electrodes and therefore polishing of the electrodes will be no longer necessary.

The pressure applied in the superposed direction of the superposed bodies for uniting while heating is carried out with resistance heat generated by supplying a current is in the range of 100 kg/cm$^2$ to 2 t/cm$^2$, or preferably 400 kg/cm$^2$ to 1.5 t/cm$^2$. Preferably, the above pressure is applied to a superposed body or at lest two superposed bodies using a known means such as through a column of a hydraulic press. In the case that a plating layer is used as the insert material, the temperature at the joint between the first and second parts, the temperature being imparted by the resistance heat generated by supplying a current, is preferably in the range of 70% to 100% of the melting point (represented by absolute temperature) of the second part. As a matter of course, the voltage and current necessary for generating the resistance heat and the applying time are set in accordance with the above required temperature at the joint.

The welding by the hot diffusion welding method of the invention is preferably carried out under vacuum or in an atmosphere of an inert gas such as argon gas or nitrogen gas, but it is also possible to carry out the welding in atmospheric air in the case where the applied pressure is made high, thereby reducing the time required for the welding.

BRIEF DESCRIPTION OF THE DRAWINGS

FIG. 1 illustrates a model of a first example according to a second form of the invention;

FIG. 2 illustrates a model of a second example according to the second form of the invention.

BEST MODE FOR CARRYING OUT THE INVENTION

Figure 3:
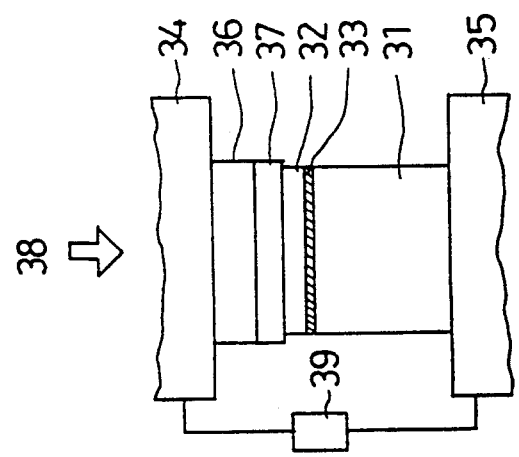
FIG. 3 is a view showing an example of a conventional method.

Referring now to the drawings, concrete examples of a hot diffusion welding method according to the invention will be described hereinbelow.

(EXAMPLE 1)

Welding was carried out using a steel material SCM440H (this material serves as a first part to which another part is to be joined) and a wear-resistant brass material P31C (this material serves as a second part which is to be joined to the first part). This wear-resistant brass material had a composition of: Zn (26 to 30 wt %); Fe (0.5 to 1.3 wt %); Al (3.5 to 4.5 wt %); Ni (2.0 to 4.0 wt %); Si (0.5 to 1.5 wt %); Co (0 to 1.0 wt %); and Cu (Bal.). This welding was carried out according to a first form of the invention.

First, pure Cu plating having a film thickness of about 5 μm was formed as an underplate on the SCM440H material and then Cu-Zn (brass) plating having a film thickness of about 20 μm was formed, whereby an insert material was prepared.

The P31C material was then placed on the surface of the insert material, thereby preparing a superposed body in which the second part, the insert material and the first part were superposed. The temperature of the superposed body was kept at 850° C. by resistance heating for 5 minutes under vacuum ($1 \times 10^{-2}$ Torr.). During the resistance heating, a pressure as indicated in Table 1 was applied for one minute from above the P31C material in the superposed direction.

After welding had been carried out as described above, the weld state was checked by conducting the non-destructive test in which the ultrasonic inspection method was adopted as well as the shearing test. The result is as shown in Table 1.

Table 1 also shows the weld states resulted from welding in which the same materials were used under different welding conditions. Also, the weld states were checked when welding was carried out under an atmosphere of argon gas and/or when the pressure was applied for 3 minutes. In those cases, the similar results were obtained.

The SCM440H material serving as the first part and the P31C material serving as the second part were firmly adhered to each other with the plating between which serves as the insert material, so that heat transition by resistance heating took place satisfactorily between the SCM440H material and the P31C material, with the joint heated to a sufficiently high temperature. The welding did not need to use an auxiliary electrode and the formation of an oxide film was not specially found on the contact faces of the electrodes.

EXAMPLE 2

Welding was carried out using the steel material SCM440H as the first part and phosphorus bronze PBC-2C as the second part. This phosphorus bronze PBC-2C had a composition of: Sn (9.0 to 12.0 wt %); P (0.05 to 0.5 wt %); and Cu (87.0 to 91.0 wt %). This welding was carried out according to the first form of the invention.

First, pure Cu plating having a film thickness of about 5 μm was formed as underplate on the SCM440H material and then Cu-Zn plating having a film thickness of about 20 μm was formed, whereby an insert material was prepared.

The PBC-2C material was then placed on the surface of the insert material, thereby preparing a superposed body in which the second part, the insert material and the first part were superposed. The temperature of the superposed body was kept at 1000° C. by resistance heating for 5 minutes under vacuum ($1 \times 10^{-2}$ Torr.). During the resistance heating, a pressure as indicated in Table 1 was applied for one minute from above the PBC-2C material in the superposed direction.

After welding had been carried out as described above, the same tests as those made in Example 1 were conducted. The result is as shown in Table 1.

Also, the weld state was checked when welding was carried out under an atmosphere of argon gas, and in this case, the similar result was obtained.

In this example, the SCM440H material serving as the first part and the PBC-2C material serving as the second part were also firmly adhered to each other with the plating between which serves as the insert material, so that heat transition by resistance heating took place satisfactorily between the SCM440H material and the P31C material, with the joint heated to a sufficiently high temperature. The welding did not need to use an auxiliary electrode, and the formation of an oxide film was not specially found on the contact faces of the electrodes.

TABLE 2

| | Welding conditions and welding status | | | | |
|---|---|---|---|---|---|
| | Welding conditions | | | Weld status | |
| | welding temperature | pressure applied | applying time | non-destructive test | shearing test |
| Example 1 | 850° C. 850° C. | 1 t/cm$^2$ 570 kg/cm$^2$ | 1 min. 1 min. | no default no default | 22.6 kg/mm$^2$ 22.2 kg/mm$^2$ |

TABLE 2-continued

| | Welding conditions and welding status | | | | |
|---|---|---|---|---|---|
| | Welding conditions | | | Weld status | |
| | welding temperature | pressure applied | applying time | non-destructive test | shearing test |
| Example 2 | 880° C. | 1 kg/cm² | 1 min. | *40–70% | 9.1 kg/mm² |
| | 1000° C. | 1 t/cm² | 1 min. | *5% or less | 19.6 kg/mm² |
| | 1000° C. | 570 kg/cm² | 1 min. | *5% or less | 18.9 kg/mm² |

*default rate

EXAMPLE 3

In this example, a brazing filler metal is used as the insert material and the hot diffusion welding method according to a second form of the invention is suitably applied.

Figure 1:
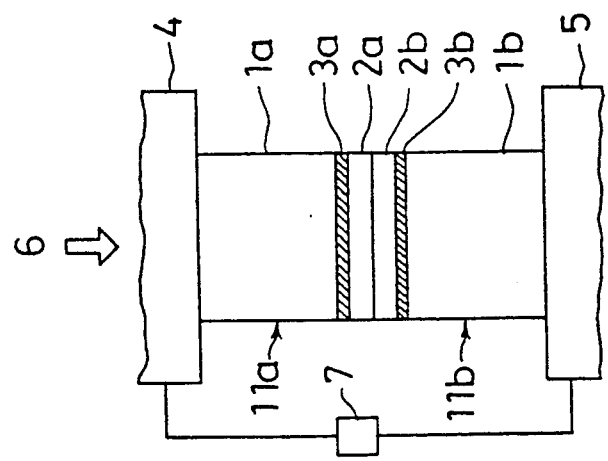

As shown in FIG. 1, a brazing filler metal 3a was interposed between a shoe 1a formed of a SCM material serving as the first part and a sliding member 2a formed of a PBC material serving as the second part, thereby forming a superposed body 11a, whilst another superposed body 11b was formed by interposing a brazing filler metal 3b between a shoe 1b formed of the SCM material serving as the first part and a sliding member 2b formed of the PBC material serving as the second part. The superposed bodies 11a and 11b thus formed were assembled in such a manner that the sliding members 2a and 2b are brought into contact with each other.

Copper electrodes 4 and 5 connected to an external power source 7 were in contact with the shoes 1a and 1b of the superposed bodies 11a and 11b respectively, the bodies 11a, 11b having been assembled. Then, a pressure 6 was applied to the superposed bodies 11a and 11b in the direction that the shoes, the brazing filler metals and the sliding members were superposed, and a voltage was applied between the copper electrodes 4 and 5. Resistance heat was generated by the current passing through the shoe 1a, the brazing filler metal 3a, the sliding member 2a, the sliding member 2b, the brazing filler metal 3b and the shoe 1b, those members being pressurized between the pair of copper electrodes 4 and 5. This resistance heating together with the application of the pressure as mentioned above caused the brazing filler metals 3a and 3b to be melt. As a result, the shoe 1a and the sliding member 2a were diffusion-welded by the brazing filler metal 3a whilst the shoe 1b and the sliding member 2b were diffusion-welded by the brazing filler metal 3b.

EXAMPLE 4

Figure 2:
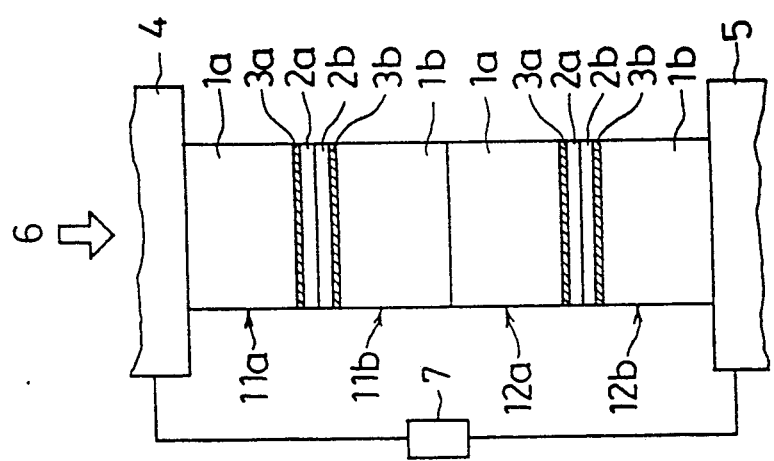
FIGS. 1 and 2 are for concrete examples of the invention.

FIG. 2 shows another example of the second form of the invention where the brazing filler metal is used as the insert material.

In this example, similarly to Example 3, the brazing filler metal 3a (3b) was interposed between the shoe 1a (1b) formed of the SCM material serving as the first part and the sliding member 2a (2b) formed of the PBC material serving as the second part. In the above way, four superposed bodies were prepared in order to be assembled. Specifically, as shown in FIG. 2, the superposed bodies 11a, 11b and 12a, 12b were assembled in series such that the sliding member 2a of the superposed body 11a came in contact with the sliding member 2b of the superposed body 11b; the shoe 1b of the superposed body 11b came in contact with the shoe 1a of the superposed body 12a; and the sliding member 2a of the superposed body 12a came in contact with the sliding member 2b of the superposed body 12b. The copper electrodes 4 and 5 were in contact with the shoe 1a of the superposed body 11a and the shoe 1b of the superposed body 12b respectively. A voltage was applied from the external power source 7 meanwhile the pressure 6 was applied in the superposed direction. In this example, a multiple and even number of superposed bodies were assembled and energized under a pressurized condition, the pressure being applied in the superposed direction, whereby hot diffusion welding of a number of superposed bodies (four bodies in this example) could be performed at the same time.

INDUSTRIAL APPLICABILITY

According to the hot diffusion welding method of the invention, when the insert material interposed between the first and second parts is plating formed on the joint face of the first part, resistance heating suitable for hot diffusion welding is evenly carried out throughout the first and second parts as well as the joint thereof. Further, the plating made from a high-purity material having little contaminant is used so that an excellent bonding strength can be achieved. Plating techniques have been already established and the manufacturing cost of plating is low compared with that of a brazing filler metal which is not commonly used. A further advantage is that resistance heating can be performed in a stable condition by supplying a current through the simplified electrodes which do not require an auxiliary electrode etc.

Even when a brazing filler metal is employed as the insert material, it is also possible for the hot diffusion welding method of the invention to perform resistance heating by supplying a current through the simplified electrodes. In such a case, bodies in each of which the first and second parts are superposed with the insert material between are assembled in the superposed direction, and during the heating and pressurizing process, the first parts having a greater thermal capacity are in contact with the electrodes. This has brought about the simplification of electrodes, eliminating the need for an auxiliary electrode etc.

With the hot diffusion welding method of the invention, not only can machine parts in which a first part and a second part are firmly adhered at the joint be obtained with ease, but also hot diffusion welding apparatus can be simplified in order to reduce the number of parts that require maintenance and to considerably improve its productivity.

I claim:

1. A hot diffusion welding method comprising:
   (a) a plating layer forming step of forming a plating layer as an insert material on a joint face of a first part to which a second part is to be joined wherein said second part is a copper metal part made from pure copper or a copper alloy, and said insert material is a copper plating layer of pure copper or a copper alloy applied to the joint face of the first part;

(b) a superposing step of superposing the second part on the first part with the plating layer between, the plating layer being formed on the joint face of the first part in the plating layer forming step; and (c) a heating and pressurizing step of heating, with resistance heat, a joint of a superposed body which has been obtained in the superposing step, the resistance heat being generated by supplying a current, and pressurizing the superposed body in the superposed direction thereof to unite the first and second parts at the joint at which the plating layer is formed.

2. The hot diffusion welding method as claimed in claim 1, wherein the joint between the first and second parts is heated, with resistance heat generated by supplying a current, to a temperature which is in the range of 70 to 100% of the melting point of the second part, the melting point being represented by absolute temperature.

3. The hot diffusion welding method as claimed in claim 1, wherein a pressure in the range of 100 kg/cm$^2$ to 2 t/cm$^2$ is applied in the superposed direction of the superposed bodies when uniting the parts.

4. The hot diffusion welding method as claimed in claim 1, wherein the joint between the first and second parts is heated, with resistance heat generated by supplying a current, to a temperature which is in the range of 70 to 100% of the melting point of the second part, the melting point being represented by absolute temperature, and a pressure in the range of 100 kg/cm$^2$ to 2 g/cm$^2$ is applied in the superposed direction of the superposed bodies when uniting the parts.

5. A hot diffusion welding method comprising:

(a) a superposing step of superposing a second part, which is a part to be joined to a first part, upon the first part with an insert material disposed between to form a superposed body;

(b) an assembling step of assembling at least two superposed bodies which have been obtained in the superposing step, in such a manner that the second parts of the superposed bodies are brought into contact with each other; and (c) a heating and pressurizing step of heating, with resistance heat, joints of the two superposed bodies which have been assembled in the assembling step, the resistance heat being generated by supplying a current, and pressurizing them in the superposed direction so that the first parts are united with the corresponding second parts in the joints at each of which the insert material is disposed without the superposed bodies directly welding to one another.

6. The hot diffusion welding method as claimed in claim 5, wherein said insert material is a plating layer applied to a joint face of the first part.

7. The hot diffusion welding method as claimed in claim 6, wherein the joint between the first and second parts is heated, with resistance heat generated by supplying a current, to a temperature which is in the range of 70 to 100% of the melting point of the second part, the melting point being represented by absolute temperature.

8. The hot diffusion welding method as claimed in claim 15, wherein said insert material is a brazing filler metal placed in the respect joints between the first and second parts.

9. The hot diffusion welding method as claimed in claim 8, wherein a pressure in the range of 100 kg/cm$^2$ to 2 t/cm$^2$ is applied in the superposed direction of the superposed bodies when uniting the parts.

10. The hot diffusion welding method as claimed in claim 5, wherein the joint between the first and second parts is heated, with resistance heat generated by supplying a current, to a temperature which is in the range of 70 to 100% of the melting point of the second part, the melting point being represented by absolute temperature, and a pressure in the range of 100 kg/cm$^2$ to 2 t/cm$^2$ is applied in the superposed direction of the superposed bodies when uniting the parts.

11. The hot diffusion welding method as claimed in claim 6, wherein the joint between the first and second parts is heated, with resistance heat generated by supplying a current, to a temperature which is in the range of 70 to 100% of the melting point of the second part, the melting point being represented by absolute temperature, and a pressure in the range of 100 kg/cm$^2$ to 2 t/cm$^2$ is applied in the superposed direction of the superposed bodies when uniting the parts.

12. The hot diffusion welding method as claimed in claim 5, wherein a pressure in the range of 100 kg/cm$^2$ to 2 t/cm$^2$ is applied in the superposed direction of the superposed bodies when uniting the parts.

13. The hot diffusion welding method as claimed in claim 6, wherein a pressure in the range of 100 kg/cm$^2$ to 2 t/cm$^2$ is applied in the superposed direction of the superposed bodies when uniting the parts.

14. The hot diffusion welding method of claim 5, wherein there are an even number of superposed bodies assembled.

15. The hot diffusion welding method of claim 14, wherein there are four superposed bodies assembled.

16. The hot diffusion welding method of claim 5, wherein a silver layer is not employed, and the copper alloy is a Cu-Zn, Cu-Sn, Cu-Al or Cu-Pb alloy.

17. A hot diffusion welding method comprising:

(a) a superposing step of superposing a second part, which is a part to be joined to a first part, upon the first part with an insert material between, wherein said second part consists of a copper metal part made from pure copper or a copper alloy, and said insert material consists of a copper plating layer made of pure copper or a copper alloy applied to the joint face of the first part;

(b) an assembling step of assembling at least two superposed bodies which have been obtained in the superposing step, in such a manner that the second parts in the respective superposed bodies are brought into contact with each other; and (c) a heating and pressurizing step of heating, with resistance heat, joints of the two superposed bodies which have been assembled in the assembling step, the resistance heat being generated by supplying a current, and pressurizing them in the superposed direction so that the first parts are united with the corresponding second parts at the joints at each of which the insert material is formed.

18. The hot diffusion welding method as claimed in claim 17, wherein said insert material is a plating layer applied to a joint face of the first part.

19. The hot diffusion welding method as claimed in claim 18, wherein the joint between the first and second parts is heated, with resistance heat generated by supplying a current, to a temperature which is in the range of 70 to 100% of the melting point of the second part, the melting point being represented by absolute temperature.

20. The hot diffusion welding method as claimed in claim 17, wherein said insert material is a brazing filler metal placed at the respect joints between the first and second parts.

21. The hot diffusion welding method as claimed in claim 20, wherein a pressure in the range of 100 kg/cm$^2$ to 2 t/cm$^2$ is applied the superposed direction of the superposed bodies when uniting the parts.

22. The hot diffusion welding method as claimed in claim 21, wherein a pressure in the range of 100 kg/cm$^2$ is applied in the superposed direction of the superposed bodies when uniting the parts.

23. The hot diffusion welding method as claimed in claim 17, wherein the joint between the first and second parts is heated, with resistance heat generated by supplying a current, to a temperature which is in the range of 70 to 100% of the melting point of the second part, the melting point being represented by absolute temperature, and a pressure in the range of 100 kg/cm$^2$ to 2 t/cm$^2$ is applied in the superposed direction of the superposed bodies when uniting the parts.

24. The hot diffusion welding method as claimed in claim 18, wherein the joint between the first and second parts is heated, with resistance heat generated by supplying a current, to a temperature which is in the range of 70 to 100% of the melting point of the second part, the melting point being represented by absolute temperature, and a pressure in the range of 100 kg/cm$^2$ to 2 t/cm$^2$ is applied in the superposed direction of the superposed bodies when uniting the parts.

25. The hot diffusion welding method as claimed in claim 17, wherein a pressure in the range of 100 kg/cm$^2$ to 2 t/cm$^2$ is applied in the superposed direction of the superposed bodies when uniting the parts.

26. The hot diffusion welding method as claimed in claim 18, wherein a pressure in the range of 100 kg/cm$^2$ to 2 t/cm$^2$ is applied in the superposed direction of the superposed bodies when uniting the parts.

* * * * *